(12) United States Patent
Aoyama

(10) Patent No.: US 11,839,170 B2
(45) Date of Patent: Dec. 12, 2023

(54) WORKING MACHINE COUPLER DEVICE AND WORKING MACHINE COUPLING METHOD

(71) Applicant: KUBOTA CORPORATION, Osaka (JP)

(72) Inventor: Kenichi Aoyama, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 448 days.

(21) Appl. No.: 17/131,882

(22) Filed: Dec. 23, 2020

(65) Prior Publication Data

US 2021/0105926 A1   Apr. 15, 2021

Related U.S. Application Data

(63) Continuation of application No. PCT/JP2019/033420, filed on Aug. 27, 2019.

(30) Foreign Application Priority Data

Aug. 31, 2018 (JP) .................................. 2018-163389

(51) Int. Cl.
*A01B 59/04* (2006.01)
*A01B 59/043* (2006.01)
*A01B 59/00* (2006.01)

(52) U.S. Cl.
CPC .......... *A01B 59/043* (2013.01); *A01B 59/004* (2013.01)

(58) Field of Classification Search
CPC .... A01B 59/043; A01B 59/004; A01B 59/066
See application file for complete search history.

(56) References Cited

U.S. PATENT DOCUMENTS 2,844,083 A * 7/1958 Du Shane ............ A01B 63/112
172/444
2,887,167 A * 5/1959 Heitshu ............... A01B 63/1117
172/444

(Continued)

FOREIGN PATENT DOCUMENTS

JP    01-141503 A    6/1989
JP     02-5802 A    1/1990

(Continued)

OTHER PUBLICATIONS

Official Communication issued in International Patent Application No. PCT/JP2019/033420, dated Nov. 19, 2019.

*Primary Examiner* — Jamie L McGowan
(74) *Attorney, Agent, or Firm* — KEATING AND BENNETT, LLP

(57) ABSTRACT

A working machine coupler device includes a top linkage, a lower linkage, a detachable frame including a second upper coupler to be coupled to a first upper coupler, and a second lower coupler to be coupled to a first lower coupler, and a top linkage controller. The second upper coupler is coupled to the first upper coupler when the lower linkage is pivoted upward, and the first lower coupler moves toward and be coupled to the second lower coupler when a front portion of the working machine is moved upward, and the top linkage controller regulates the stretching and shortening of the top linkage to hold the detachable frame inclining backward, and allows the top linkage to be shortened until the working machine takes a working posture after the lower linkage is pivoted downward from a state where the front portion of the working machine is lifted.

8 Claims, 13 Drawing Sheets

(56) References Cited

U.S. PATENT DOCUMENTS

| | | | | | |
|---|---|---|---|---|---|
| 3,140,103 | A | * | 7/1964 | Richardson | A01B 59/062 172/450 |
| 3,427,046 | A | * | 2/1969 | Muncke | A01B 59/062 172/272 |
| 3,561,789 | A | * | 2/1971 | Stikeleather | A01B 63/12 172/272 |
| 3,572,759 | A | * | 3/1971 | Baugh | A01B 59/062 172/430 |
| 3,572,761 | A | * | 3/1971 | Tapp | A01B 59/004 280/479.1 |
| 3,572,763 | A | * | 3/1971 | Cannon | A01B 59/004 172/272 |
| 3,731,746 | A | * | 5/1973 | Walberg | A01B 63/22 91/363 A |
| 3,731,951 | A | * | 5/1973 | Gruenberger | A01B 59/004 403/44 |
| 3,829,128 | A | * | 8/1974 | Sutton | A01B 59/062 172/272 |
| 4,074,639 | A | * | 2/1978 | Hodgson | A01C 23/021 280/410 |
| 4,340,240 | A | * | 7/1982 | Anderson | B60D 1/07 280/416.2 |
| 4,418,935 | A | * | 12/1983 | O'Connor | B60D 1/465 403/46 |
| 4,738,461 | A | * | 4/1988 | Stephenson | A01B 71/066 180/14.4 |
| 4,805,927 | A | * | 2/1989 | Stephenson | A01B 71/066 280/475 |
| 4,930,801 | A | * | 6/1990 | Gillund | B62D 49/04 172/449 |
| 5,029,650 | A | * | 7/1991 | Smit | A01B 59/062 172/272 |
| 5,303,790 | A | * | 4/1994 | Coleman | B62D 49/065 180/53.3 |
| 5,697,454 | A | * | 12/1997 | Wilcox | A01B 59/068 280/460.1 |
| 5,997,024 | A | * | 12/1999 | Cowley | A01B 59/004 172/605 |
| 9,775,276 | B2 | * | 10/2017 | Hyder | A01B 63/14 |
| 10,557,237 | B2 | * | 2/2020 | Kueper | E01H 5/066 |
| 2004/0216654 | A1 | * | 11/2004 | Fischer | A01C 7/208 111/52 |
| 2006/0056917 | A1 | * | 3/2006 | McCormick | E02F 5/101 405/116 |
| 2018/0372490 | A1 | * | 12/2018 | Gresch | A01B 76/00 |

FOREIGN PATENT DOCUMENTS

| | | | |
|---|---|---|---|
| JP | H025802 A | * | 1/1990 |
| JP | 11-243711 A | | 9/1999 |
| JP | 2005-006518 A | | 1/2005 |

* cited by examiner

WORKING MACHINE COUPLER DEVICE AND WORKING MACHINE COUPLING METHOD

CROSS REFERENCE TO RELATED APPLICATIONS

This application is a continuation application of International Application No. PCT/JP2019/033420, filed on Aug. 27, 2019, which claims the benefit of priority to Japanese Patent Application No. 2018-163389 filed on Aug. 31, 2018. The entire contents of each of these applications are hereby incorporated herein by reference.

BACKGROUND OF THE INVENTION

1. Field of the Invention

The present invention relates to a working machine coupler device for coupling a working machine to a traveling vehicle and to a working machine coupling method.

2. Description of the Related Art

The device disclosed in Japanese Unexamined Patent Publication No. H11-243711 is known as a working machine coupler device for coupling a working machine to a traveling vehicle (tractor).

The working machine coupler device disclosed in Japanese Unexamined Patent Publication No. H11-243711 includes a three-point linkage mechanism. The three-point linkage mechanism includes a top linkage and a lower linkage pivotally connected to the rear portion of the tractor. The rear portion of the top linkage and the lower linkage are connected by a detachable frame. The working machine includes a first upper coupler portion and a first lower coupler portion. The detachable frame is provided with a second upper coupler portion that engages the first upper coupler portion and a second lower coupler portion that engages the first lower coupler portion.

To couple the working machine to the tractor, the second upper coupler portion is positioned below the first upper coupler portion, and the second upper coupler portion is engaged with the first upper coupler portion by lifting the lower linkage from this state. Then, when the lower linkage is lifted further, the working machine is lifted up and pivoted forward around the first upper coupler portion. When the working machine pivots forward, the first lower linkage is automatically coupled close to the second lower linkage. In this manner, the working machine is coupled to the tractor.

SUMMARY OF THE INVENTION

A working machine coupler device according to one aspect of a preferred embodiment of the present invention, includes a top linkage pivotally supported on a traveling vehicle upward and downward, the top linkage being configured to stretch and shorten, a lower linkage pivotally supported on the traveling vehicle upward and downward, a detachable frame connecting the top linkage and the lower linkage, the detachable frame including a second upper coupler to be coupled to a first upper coupler provided to a working machine, and a second lower coupler to be coupled to a first lower coupler provided to the working machine, and a top linkage controller to control stretching and shortening of the top linkage. The second upper coupler of the detachable frame inclining backward is coupled to the first upper coupler when the lower linkage is pivoted upward, and the first lower coupler is configured to move toward and be coupled to the second lower coupler when a front portion of the working machine is moved upward, and the top linkage controller mechanism is configured to regulate the stretching and shortening of the top linkage to hold the detachable frame inclining backward, and allows the top linkage to be shortened until the working machine takes a working posture after the lower linkage is pivoted downward from a state where the front portion of the working machine is lifted.

A working machine coupling method according to one aspect of a preferred embodiment of the present invention, which couples a working machine to a traveling vehicle with a working machine coupler device including a top linkage pivotally supported on a traveling vehicle upward and downward, the top linkage being configured to stretch and shorten, a lower linkage pivotally supported on the traveling vehicle upward and downward, and a detachable frame connecting the top linkage and the lower linkage, the detachable frame including a second upper coupler to be coupled to a first upper coupler provided to a working machine, and a second lower coupler to be coupled to a first lower coupler provided to the working machine, includes stretching the top linkage to incline the detachable frame backward, moving the lower linkage upward with respect to the working machine to engage the second upper coupler with the first upper coupler in a state where the detachable frame inclines backward, moving the lower linkage upward to lift a front portion of the working machine after engaging the second upper coupler with the first upper coupler to engage the second lower coupler with the first lower coupler, and moving the lower linkage downward until the working machine takes a working posture from a state where the front portion of the working machine is lifted.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
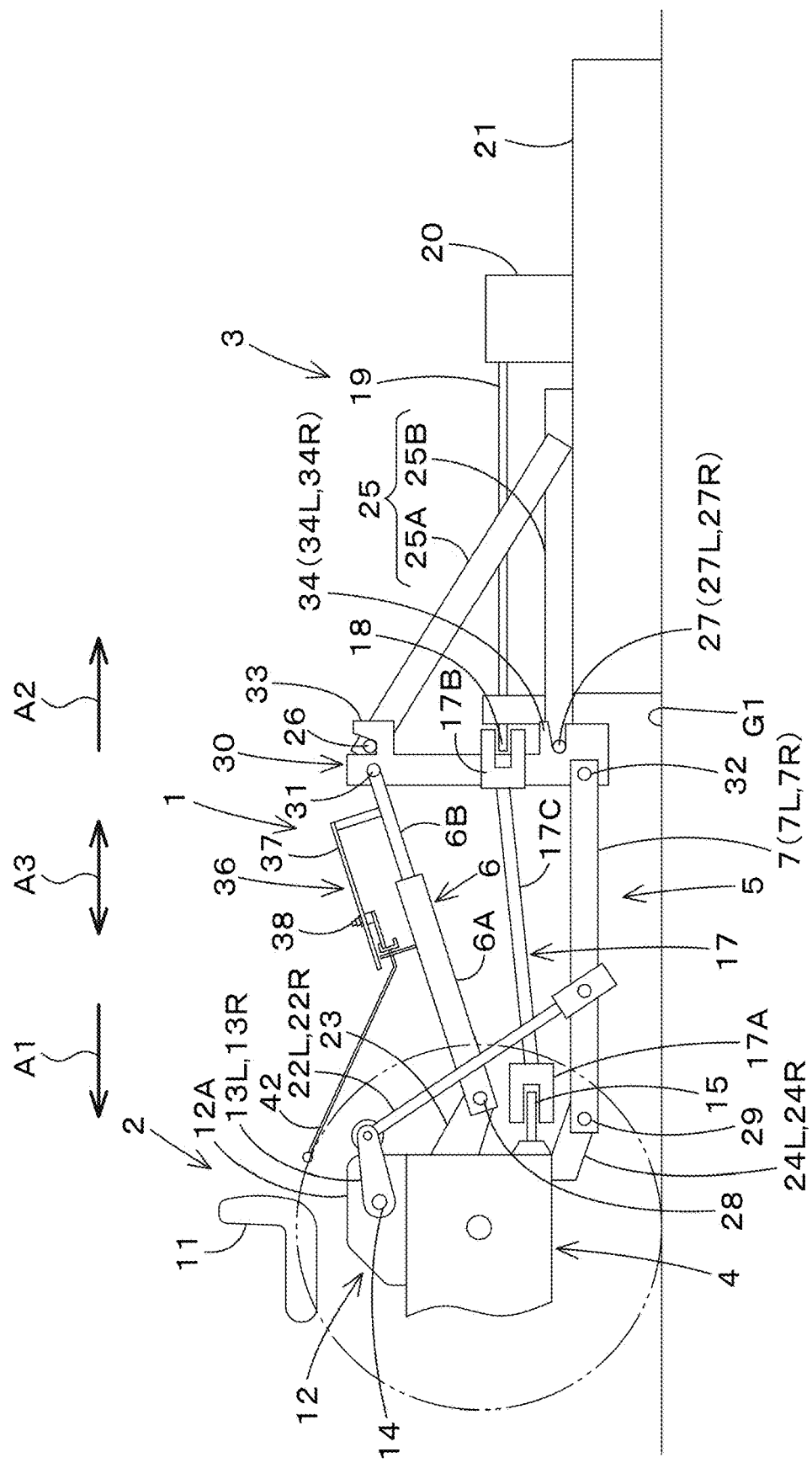
FIG. 1 is a schematic side view illustrating a state where a working machine is coupled to a traveling vehicle with a working machine coupler device.

The preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

FIG. 1 is a schematic side view of a working machine coupler device 1 according to the present preferred embodiment. The working machine coupler device 1 connects a working machine 3 to a traveling vehicle 2. In this preferred embodiment, a tractor is illustrated as the traveling vehicle 2. The traveling vehicle is hereafter referred to as the tractor 2. A rear-mounted mower (rear cutter) or other ground working machine is exemplified as the working machine 3.

In this preferred embodiment, a direction of an arrowed line A1 direction in FIG. 1 (a forward direction of the tractor 2) is referred to as the front, and a direction of an arrowed line A2 in FIG. 1 (a backward direction of the tractor 1) is referred to as the rear. Thus, the front surface side of FIG. 1 is referred to the left, and the back surface side of FIG. 1 is referred to the right. The horizontal direction orthogonal to the front-to-rear direction A3 is explained as a vehicle width direction. The direction from the center to the right or left portion of the vehicle width direction in tractor 2 is explained as the outside of the vehicle (also referred to as a vehicle outward direction). In other words, the vehicle outward direction is the direction in the vehicle width direction separating away from the center of the tractor 2. A direction opposite to the vehicle outward direction is explained as a vehicle inward direction (also referred to as a vehicle inward direction). In other words, the vehicle inward direction is the direction in the vehicle width direction approaching closer to the center of the tractor 2.

As shown in FIG. 1, the tractor 2 includes a vehicle body 4. The vehicle body 4 includes, for example, a prime mover as a power source, a flywheel housing that houses a flywheel, a clutch housing that houses a clutch to intermittently transmit the power of the prime mover transmitted through the flywheel, and a transmission case that houses a transmission to shift the power transmitted through the clutch, which are arranged and directly connected in a front-to-rear direction of the vehicle body. The prime mover is, for example, a diesel engine.

The tractor 2 includes an operator seat 11 and a hydraulic system 12 mounted on the rear portion of the vehicle body 4. The hydraulic system 12 includes a left lift arm 13L on the left side of the body 12A and a right lift arm 13R on the right side of the body 12A. The lift arms 13L and 13R are attached to a rotation shaft 14 whose front portion includes a horizontal axial center (axial center extending in the vehicle width direction) and can be pivoted up and down by rotating the rotation shaft 14 around the axial center in the hydraulic driving. The upper portion of the left lift rod 22L is rotatably connected to the rear portion of the lift arm 13L, and the upper portion of the right lift rod 22R is rotatably connected to the rear portion of the lift arm 13R, which is rotatably connected to the rear portion of the lift arm 13R.

On the back of the vehicle body 4, a PTO shaft 15 is provided. The PTO shaft 15 is a power take-out shaft that takes power from the prime mover externally. The PTO shaft 15 is interlocked with the PIC shaft 18 of the working machine 3 via a drive shaft 17. The drive shaft 17, for example, includes a universal joint and includes a first universal joint 17A, a second universal joint 17B, and a joint shaft 17C. The first universal joint portion 17A is connected to the PTO shaft 15. The second universal joint 17B is connected to the PIC axis 18. The joint shaft 17C connects and interlock the first universal joint portion 17A and the second universal joint portion 17B. The joint shaft 17C is freely telescopic in length. The term "telescoping" means that it is free to stretch and shorten in length. The term "stretching" means that the length is increased, and the term "shortening" means that the length is reduced.

The rear portion of tractor 2 is provided with a top linkage bracket 23, a left lower linkage bracket 24L and a right lower linkage bracket 24R. The top linkage bracket 23 is fixed to the upper rear portion of the vehicle body 4. The lower linkage bracket 24L is fixed to the left rear bottom of the vehicle body 4. The lower linkage bracket R is fixed to the right rear bottom of the vehicle body 4.

The PIC shaft 18 is an input shaft to input power transmitted from the tractor 2 through the drive shaft 17 to the working machine 3. The power transmitted to the PIC shaft 18 is input to the transmission mechanism in the transmission case 20 through the transmission shaft 19. The power transmitted to the transmission mechanism in the transmission case 20 is transmitted to a ground working device provided in the cover case 21. The ground working device is, for example, a mower device including a mower blade (mowing blade) that mows the grass, a drive mechanism to drive the mower blade, and the like, as a rear-mounted mower.

As shown in FIG. 1, the working machine 3 includes an attachment frame 25. The attachment frame 25 includes a first frame member 25A and a second frame member 25B. The first frame member 25A is provided in an inclined manner that transitions upward from the cover case 21 toward the front. A first upper coupler portion 26 is provided in the front upper portion of the first frame member 25A. The first upper coupler portion 26 includes, for example, a pin having a transverse axis center. A second frame member 25B extends forward on the cover case 21. A first lower coupler portion 27L and a first lower coupler portion 27R are provided at the front portion of the second frame member 25B. The first lower coupler portion 27L is located on the left side of the working machine 3, and the first lower coupler portion 27R is located on the right side of the working machine 3. The first lower coupler portion 27L and the first lower coupler portion 27R include a pin with a transverse axis center, for example.

As shown in FIG. 1, the working machine coupler device 1 includes a three-point linkage mechanism 5 attached to the rear portion of the tractor 2. The three-point linkage mechanism 5 includes one top linkage 6 and two lower linkages 7 (lower linkage 7L and lower linkage 7R). The top linkage 6 is located in the center of the vehicle width direction of the vehicle body 4 and above the lower linkage 7L and the lower linkage 7R. The top linkage 6 includes a cylinder (first member) 6A and a rod member (second member) 6B. The front portion of the top linkage 6 (cylinder 6A) is rotatably connected to the top linkage bracket 23 via a pivot axis 28 to rotate freely around the horizontal axis center. The rod member 6B is inserted into the cylinder 6A freely in and out of the rear portion. The rod member 6B is movable in the longitudinal direction of the top linkage 6. That is, the top linkage 6 is stretchable in length.

The top linkage 6 may be configured such that the rod member 6B is located to the front and the cylinder 6A is located to the rear. In this case, the rod member 6B is pivoted to the top linkage bracket 23 and the cylinder 6A is pivoted to the detachable frame 30 described below.

The lower linkage 7L is rotatably connected at the front to the left lower linkage bracket 24L via a pivot axis 29 around the transverse axis center. The lower portion of the left lift arm 13L is pivotally connected to the middle portion of the lower linkage 7L in the longitudinal direction. The front portion of the lower linkage 7R is rotatably connected to the right lower linkage bracket 24R via a pivot axis 29 to the right lower linkage bracket 24R, which is rotatably connected around the horizontal axis center. The lower portion of the right lift arm 13R is pivotally connected to the middle of the lower linkage 7R in the longitudinal direction. Thus, the lower linkage 7L and the lower linkage 7R can be raised and lowered (pivoted up and down) by pivoting the lift arm 13L and the lift arm 13R up and down by the pivoting axis 14.

The rear portion of the top linkage 6 and the rear portion of the lower linkages 7L and 7R are connected by the detachable frame 30. The rear portion of the top linkage 6 (rod member 6B) is rotatably connected to the upper portion of the detachable frame 30 via a pivot axis 31, which is rotatable around the horizontal axis center. The rear portion of the lower linkage 7L is rotatably connected to the lower and left side of the detachable frame 30 via the pivot axis 32 in the transverse axis. The rear portion of the lower linkage 7R is rotatably coupled at the bottom and on the right side of the detachable frame 30 via the pivot axis 32 in the lower portion of the detachable frame 30 and rotatably around the transverse axis.

In the following description, the lower linkage 7L and the lower linkage 7R may be collectively referred to as the lower linkage 7.

On the upper portion of the detachable frame 30, a second upper coupler portion 33 is provided which engages the first upper coupler portion 26. The second upper coupler portion 33 includes a groove which opens upwardly and allows the first upper coupler portion 26 to be inserted, and is preferably hook-shaped. Thus, the second upper coupler portion 33 can be engaged with the first upper coupler portion 26 from below. The working machine 3 can be rotated around the first upper coupler portion 26 with the second upper coupler portion 33 engaged with the first upper coupler portion 26. In other words, the working machine 3 is pivotable in the direction of proximity and detachment with respect to the detachable frame 30 with the second upper coupler portion 33 engaged with the first upper coupler portion 26.

The lower portion of the detachable frame 30 is provided with a second lower coupler portion 34L that engages the first lower coupler portion 27L and the second lower coupler portion 34R that engages the first lower coupler portion 27R. The second lower coupler portion 34L includes a groove that is open toward the rear and into which the first lower coupler portion 27L can be inserted. The first lower coupler portion 27L can engage with the second lower coupler portion 34L when the working machine 3 is pivoted around the first upper coupler portion 26 in a direction approaching close to the detachable frame 30. The second lower coupler portion 34R includes a groove that opens backward and allows the first lower coupler portion 27R to be inserted thereto. The first lower coupler portion 27R can engage with the second lower coupler portion 34R when the working machine 3 pivots around the first upper coupler portion 26 in a direction approaching close to the detachable frame 30. The second lower coupler portion 34L is provided with a locking mechanism (not shown in the drawings) that regulates the first lower coupler portion 27L to be detached from the second lower coupler portion 34L. The second lower coupler portion 34R is also provided with a locking mechanism (figure omitted) that regulates detachment of the first lower coupler portion 27R from the second lower coupler portion 34R.

In the following description, the first lower coupler portion 27L and the first lower coupler portion 27R are collectively referred to as the first lower coupler portion 27, and the second lower coupler portion 34L and the second lower coupler portion 34R may be collectively referred to as the second lower coupler portion 34.

At the middle portion of the detachable frame 30 in the vertical direction, the second universal joint portion 17B of the drive shaft 17 is pivotally supported up and down (pivotable). This allows the PIC shaft 16 to automatically couple to the second universal joint 17B when the working machine 3 is pivoted in a direction proximate to the detachable frame 30 around the first upper coupler portion 26.

As shown in FIG. 1, the working machine 3 includes a top linkage controller mechanism 36 that controls the stretching and shortening of the top linkage 6.

Figure 2:
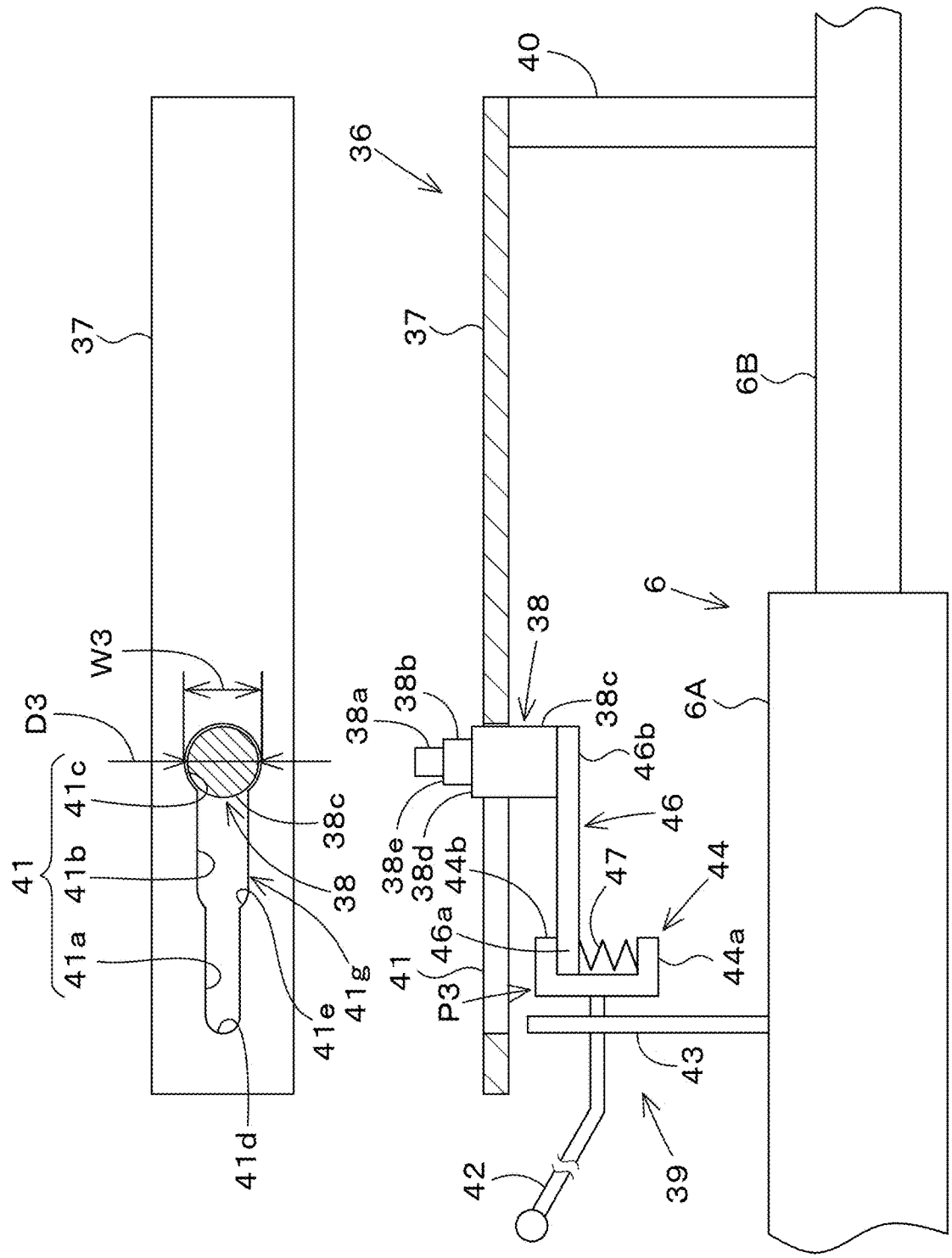
FIG. 2 is a view illustrating a top linkage controller mechanism that locks stretch of a top linkage, including a plan view on the upper side and a side view on the lower side.

As shown in FIG. 2, the top linkage controller mechanism 36 includes a plate member 37, an engagement member (engagement pin) 38, and a switching mechanism 39.

As shown in FIG. 2, the plate member 37 is constructed of a plate material elongated in the length direction of the top linkage 6 and is arranged above the top linkage 6. The plate member 37 is arranged over the cylinder 6A from the rod member 6B, and one end side (rear) is attached to the rod member 6B by the support member 40. Thus, the plate member 37 moves in synchronization with the rod member 6B. The plate member 37 includes an engagement groove 41 with which the engagement member 38 engages. The engagement groove 41 is located in the front portion of the plate member 37. The engagement groove 41 is a groove extending through the plate member 37 and is located in a long groove elongated in the length direction of the top linkage 6.

Figure 3:
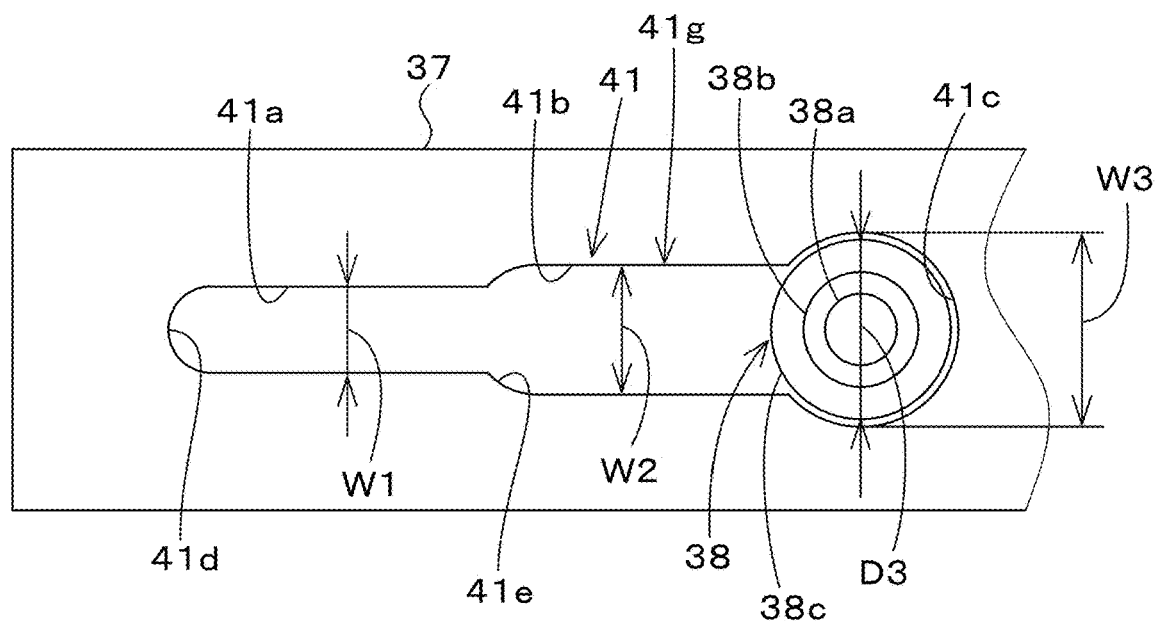
FIG. 3 is an enlarged view of a main portion of a top linkage mechanism, including a plan view on the upper side and a side view on the lower side.
Figure 3:
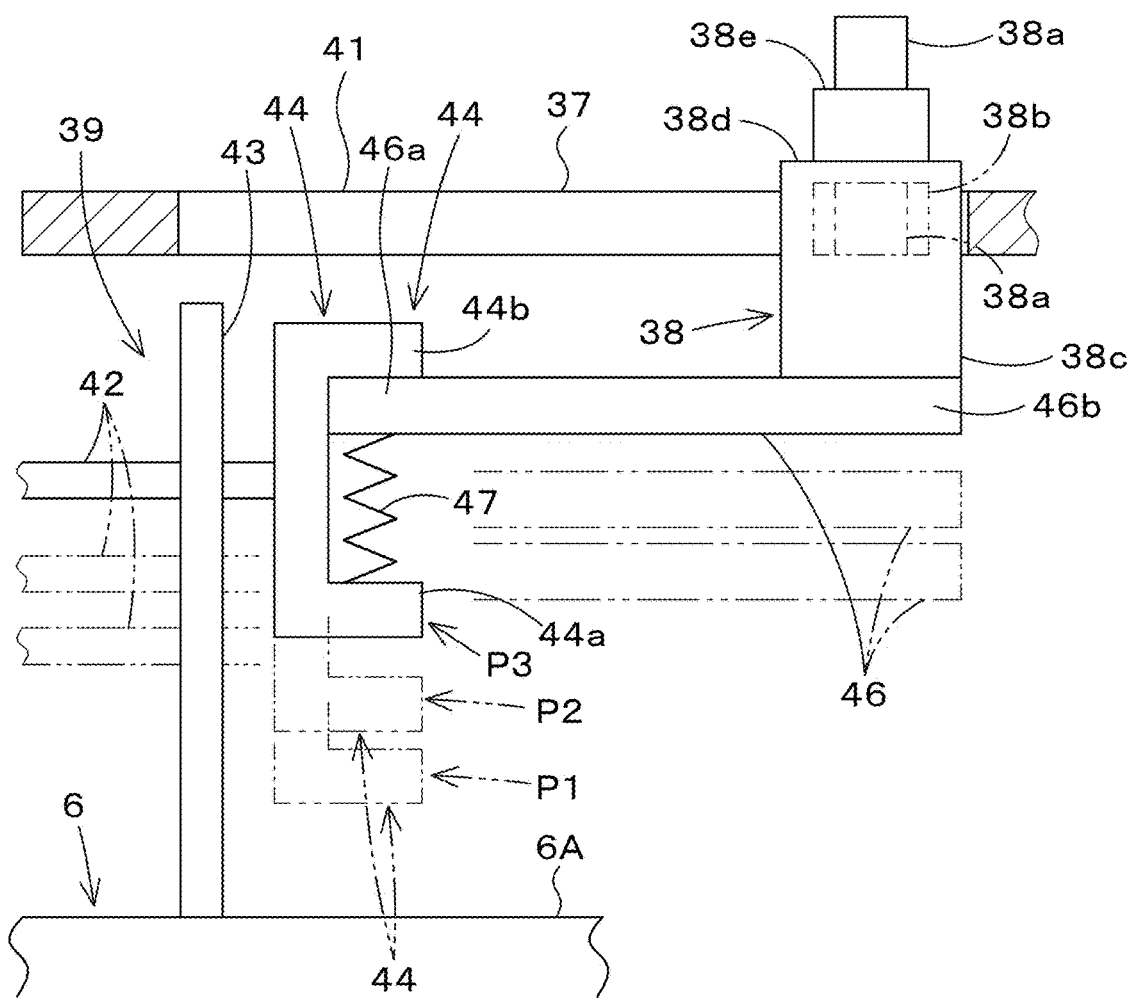

As shown in FIG. 3, the engagement groove 41 includes a first groove portion 41a, a second groove portion 41b, and a lock portion (locking hole) 41c. The first groove portion 41a includes the front portion of the engagement groove 41 and is provided in a long groove in the longitudinal direction of the plate member 37. The second groove portion 41b includes the middle portion of the engagement groove 41 and is provided in a long groove in the longitudinal direction of the plate member 37. The second groove portion 41b is continuous with the first groove portion 41a. The lock portion 41c includes a rear portion of the engagement groove 41 and includes a circular hole. The lock portion 41c is continuous with the second groove portion 41b. The second groove portion 41b and the lock portion 41c include a floating portion 41g.

As shown in FIG. 3, the second groove portion 41b has a wider groove width than the first groove portion 41a. In other words, the groove width W1 of the first groove portion 41a is narrower than the groove width W2 of the second groove portion 41b. The lock portion 41c includes a hole of diameter W3, which is larger than the groove width W2 of the second groove portion 41b.

As shown in FIG. 3, the engagement member 38 includes a stepped pin having a plurality of sites of different diameters. In detail, the engagement member 38 includes a first portion 38a in the upper portion, a second portion (semi-locking engagement portion) 38b in the middle of the vertical direction, and a third portion (locking engagement portion) 38c in the lower portion. The first portions 38a, second portions 38b and third portions 38c preferably have a cylindrical and concentric shape. The second portion 38b preferably has a larger diameter than the first portion 38a, and the third portion 38c preferably has a larger diameter than the second portion 38b.

As shown in FIG. 3, the engagement member 38 is located on the lower side of the engagement groove 41 and is supported by the switching mechanism 39 such that a vertical position is changeable (changeable in the direction of proximity and separation from the engagement groove 41). In detail, the switching mechanism 39 supports the engagement member 38 to be movable between a position where the first portion 38a can be inserted into the engagement groove 41 (first groove 41a) (see FIG. 4), a position where the second portion 38b can be inserted into the engagement groove 41 (second groove 41b) (see FIG. 5), and a position where the first portion 38c can be inserted into the engagement groove 41 (lock portion 41c) (see FIG. 2).

Figure 4:
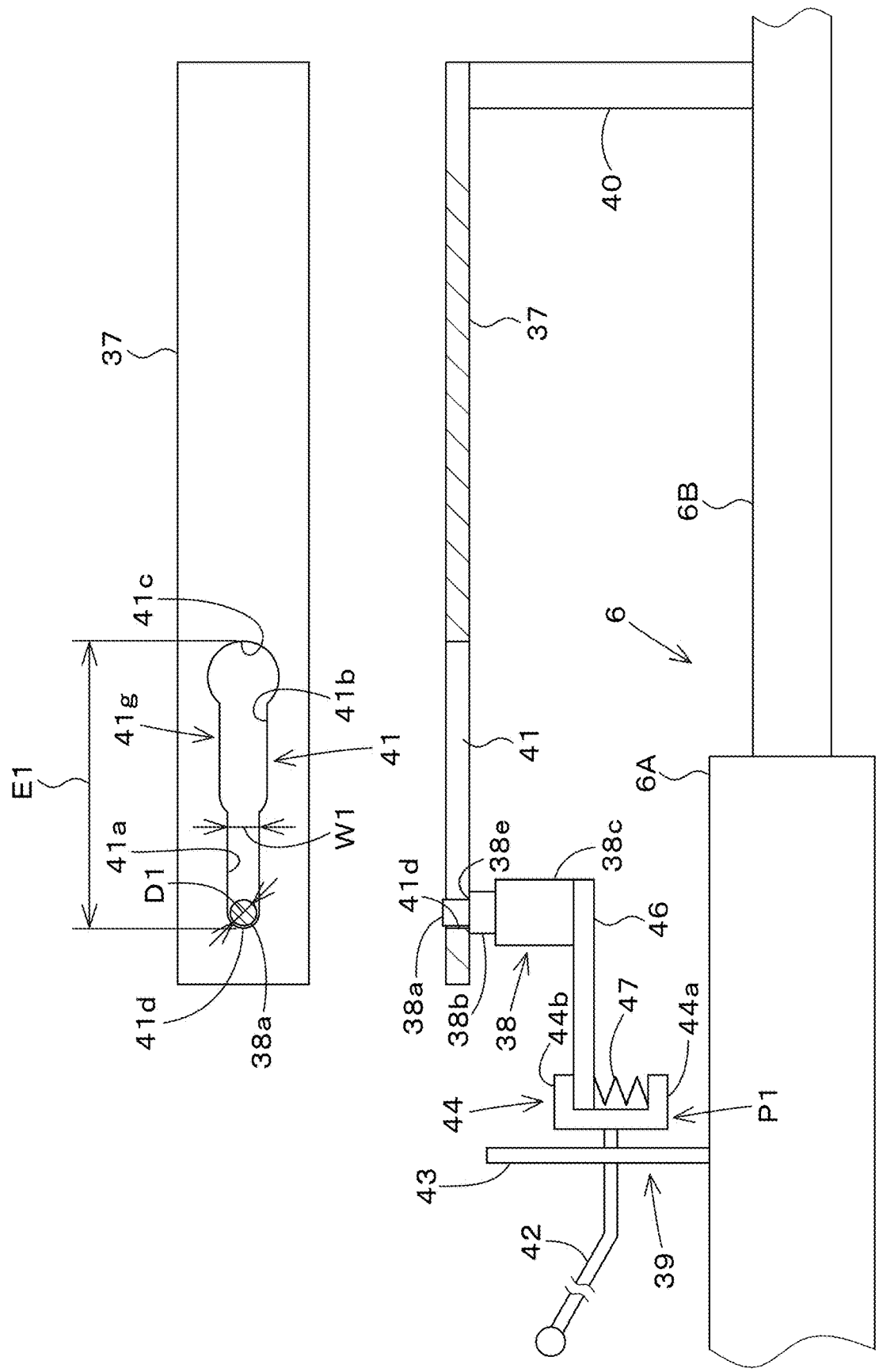
FIG. 4 is a view of a top linkage mechanism, including a plan view on the upper side and a side view on the lower side.

As shown in FIG. 4, the diameter D1 of the first portion 38a preferably has a dimension equal or roughly equal to the groove width W1 of the first groove 41a. The first portion 38a is insertable into the first groove 41a and can move along the longitudinal direction in the first groove 41a, relative to the first groove 41a. Thus, the first portion 38a is able to move between the front end and the rear end of the engagement groove 41 relative to the engagement groove 41. In detail, the first portion 38a is movable relative to the engagement groove 41 in an area (first range) E1 between the first regulator portion 41d that is the end (front end) of the first groove 41a and the rear end of the lock portion 41c. In other words, the top linkage 6 is extendable and retractable to the extent that the first region 38a moves relative to the first range E1 in a state where the first region 38a is located in the engagement groove 41.

Figure 5:
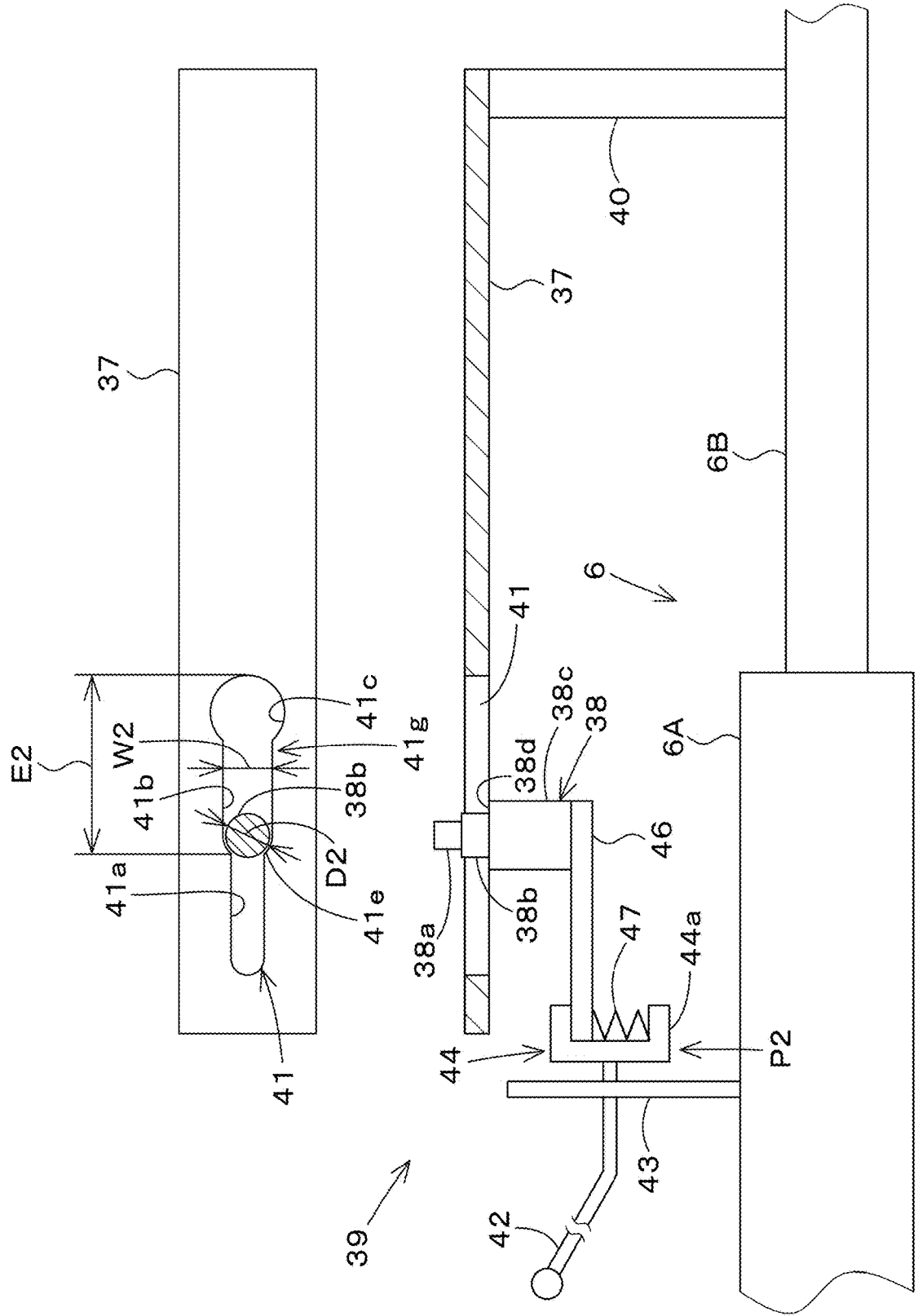
FIG. 5 is a view of a top linkage mechanism, including a plan view on the upper side and a side view on the lower side.

As shown in FIG. 5, the diameter D2 of the second portion 38b preferably has a dimension roughly equal to the groove width W2 of the second groove 41b. The second portion 38b can be inserted into the second groove 41b and can move along the longitudinal direction in the second groove 41b relative to the second groove 41b. Thus, the second portion 38b is able to move relative to the engagement groove 41 in the range (second range) E2 between the second regulator portion 41e that is the end (front end) of the second groove 41b and the rear end of the lock portion 41c. In other words, the top linkage 6 is extendable and retractable to the extent that the second portion 38b moves relative to the second range E2 in the state where the second portion 38b is located in the engagement groove 41. The second range E2 in which the second site 38b moves relative to the engagement groove 41 is narrower than the first range E1 in which the first portion 38a moves relative to the engagement groove 41.

As shown in FIG. 2 and FIG. 3, the diameter D3 of the third portion 38c preferably has the same or substantially the same diameter as the diameter W3 of the lock portion 41c. The third portion 38c can be inserted into the lock portion 41c. Thus, when the third portion 38c is fitted into the lock portion 41c, the top linkage 6 is unable to extend and retract. That is, the extension and retraction of the top linkage 6 is locked.

As shown in FIG. 3, the switching mechanism 39 includes an operation lever (operating member) 42, a fixed member 43, a movable member 44, a support member 46, and a biasing spring 47.

The operation lever 42 is a member that operates the switching mechanism 39 (movable member 44) and extends to the vicinity of the operator seat 11, as shown in FIG. 1, and can be operated by an operator seated on the operator seat 11.

As shown in FIG. 3, the fixed member 43 is fixed to the cylinder 6A, and the base of the operation lever 42 is engaged so as to be adjustable in the vertical position. The movable member 44 is fixed to the base of the operation lever 42. The support member 46 is supported by the movable member 44 at one end (front portion) 46a, which can be moved up and down. The support member 46 protrudes rearwardly from the movable member 44, and the engagement member 38 is fixed to the other end (rear portion) 46b of the support member 46. The biasing spring 47 includes a compression spring and is interposed in a compressed manner between one end side 46a of the support member 46 and the lower portion 44a of the movable member 44. Thus, the biasing spring 47 displaces the support member 46 upwardly. The support member 46 includes one end side 46a in contact with the upper portion 44b of the movable member 44, thus regulating its upward movement. The support member 46 is capable of moving downward against the force of the biasing spring 47 (spring force).

As shown in FIG. 3, the movable member 44 can be repositioned to a first position P1, a second position P2, and a third position P3. The first position P1 is a position where the first portion 38a can be inserted into the engagement groove 41, as shown in FIG. 4. The second position P2 is a position where the second portion 38b can be inserted into the engagement groove 41, as shown in FIG. 5. The third position P3 is a position where the third portion 38c can be inserted into the engagement groove 41, as shown in FIG. 2 and FIG. 3.

The movable member 44 is operable by an operator seated on the operator seat 11 via the operation lever 42 to change the position between the first position P1, the second position P2 and the third position P3. In detail, the operation lever 42 is detachably engaged and disengaged to the fixed member 43 with the movable member 44 in the first position P1, the second position P2 and the third position P3. In other words, the operation lever 42 is engaged with the fixed member 43 to hold the movable member 44 at the first position P1, the second position P2 or the third position P3. By releasing the engagement of the operation lever 42 to the fixed member 43, the movable member 44 can be repositioned.

The top linkage controller mechanism 36 described in this preferred embodiment is an example and is not limited to the aforementioned configuration. For example, the engagement member 38 and the switching mechanism 39 may be provided on the rod member 6B and the plate member 37 may be provided on the cylinder 6A. The rod member 6B may be pivoted to the top linkage bracket 23 and the cylinder 6A may be pivoted to the detachable frame 30.

Next, referring to FIG. 6 to FIG. 9, the coupling configuration (first coupling configuration) of coupling the direct-mounted working machine 3 to the tractor 2 will be described.

Figure 6:
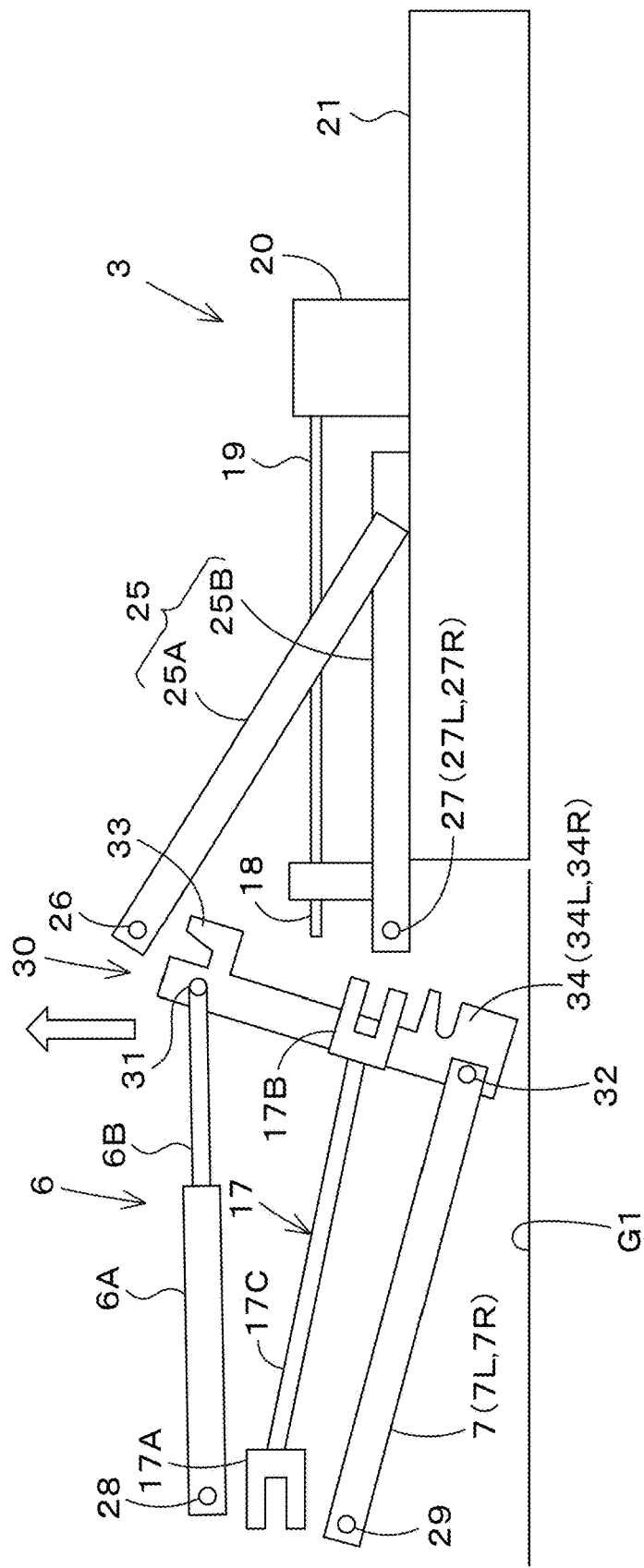
FIG. 6 is a side view illustrating a state before coupling of a direct-mounting working machine.

In the first coupling configuration, the movable member 44 is first placed at the first position P1, as shown in FIG. 4. That is, the first portion 38a is positioned in the engagement groove 41 and is capable of relatively moving relative in the first range E1. Before coupling the working machine 3, the top linkage 6 is extended and the detachable frame 30 is tilted backward, as shown in FIG. 6. At this time, as shown in FIG. 4, the detachable frame 30 is held in a posterior tilt by the first portion 38a touching the first regulator portion 41d, as shown in FIG. 4. Meanwhile, the working machine 3 is placed on a ground or other ground surface G1 in the working posture, which is a posture for working. The tractor 2 is moved backward with the detachable frame 30 tilted backward against the working machine 3 in this working posture, and the second upper coupler portion 33 is positioned below the first upper coupler portion 26, as shown in FIG. 6.

Figure 7:
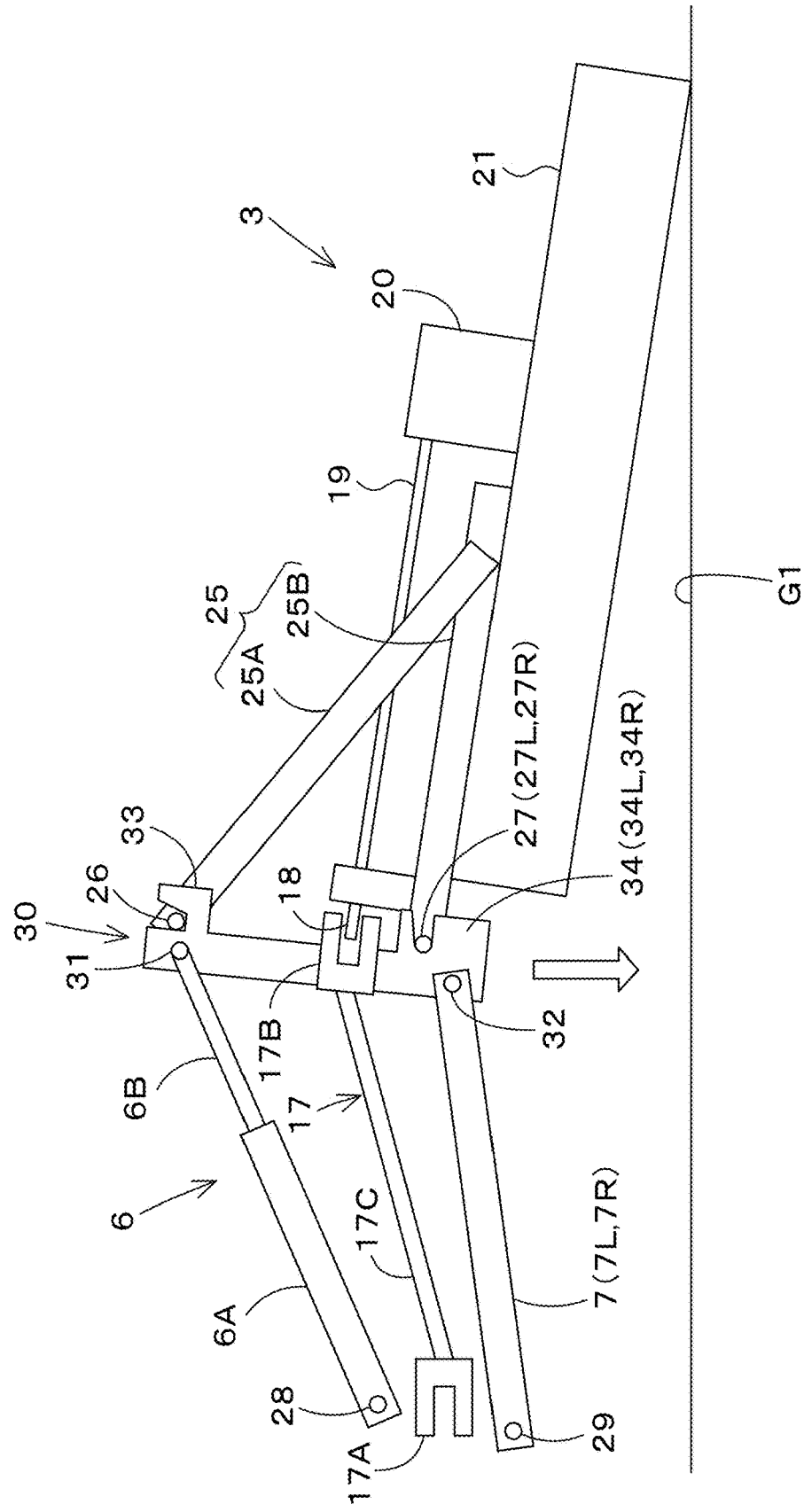
FIG. 7 is a side view illustrating a state where a direct-mounting working machine is coupled to a detachable frame.

Next, the lower linkage 7 is pivoted upward to lift the detachable frame 30, and the second upper coupler portion 33 is engaged with the first upper coupler portion 26. Then, when the detachable frame 30 is lifted further, the front portion of the working machine 3 is lifted up and the front portion of the working machine 3 moves upward, as shown in FIG. 7. As the front portion of the working machine 3 moves upward, the working machine 3 pivots around the first upper coupling 26 in a direction (forward) approaching close to the detachable frame 30, and the first lower coupling 27 is automatically engaged with the second lower coupler portion 34 in close proximity. At this time, the PIC shaft 16 is also automatically coupled to the second universal joint 17B. This causes the working machine 3 to be automatically coupled to the tractor 2. When the first lower coupling 27 is engaged with the second lower coupler portion 34, the locking mechanism provided in the second lower coupler portion 34 is automatically activated, and the locking mechanism regulates the detachment of the first lower coupling 27 from the second lower coupler portion 34.

Next, the movable member 44 is placed at the third position P3. That is, the movable member 44 is placed at a position where the third portion 38c can be inserted into the engagement groove 41 (lock portion 41c). However, in the state shown in FIG. 7, the first portion 38a is inserted in the first groove 41a and the upper surface 38e of the second portion 38b is in contact with the lower surface of the plate member 37 (see FIG. 4). In other words, the engagement member 38 does not move when the movable member 44 is placed at the third position P3. Thus, when the movable member 44 is positioned at the third position P3, the movable member 44 moves upward relative to the support member 46 and the engagement member 38, and the support member 46 becomes detached from the upper portion 44b of the movable member 44.

Next, from the state in which the front portion of the working machine 3 is moved upward (forward inclining state), as shown in FIG. 7, the lower linkage 7 is pivoted downward to lower the detachable frame 30. Then, the front portion of the working machine 3 is lowered and the front portion of the working machine 3 is lowered to take the working posture shown in FIG. 8. As the front portion of the working machine 3 lowers, the top linkage 6 shortens and the plate member 37 moves forward with respect to the engagement member 38. In other words, the engagement member 38 moves backward relative to the engagement groove 41. When the engagement member 38 moves to a position corresponding to the second groove 41b as the top linkage 6 shortens, the support member 40 and the engagement member 38 are lifted by the force the biasing spring 47, so that the second portion 38b fits into the second groove 41b and the upper surface 38d of the third portion 38c touches the lower surface of the plate member 37 (see FIG. 5).

Figure 8:
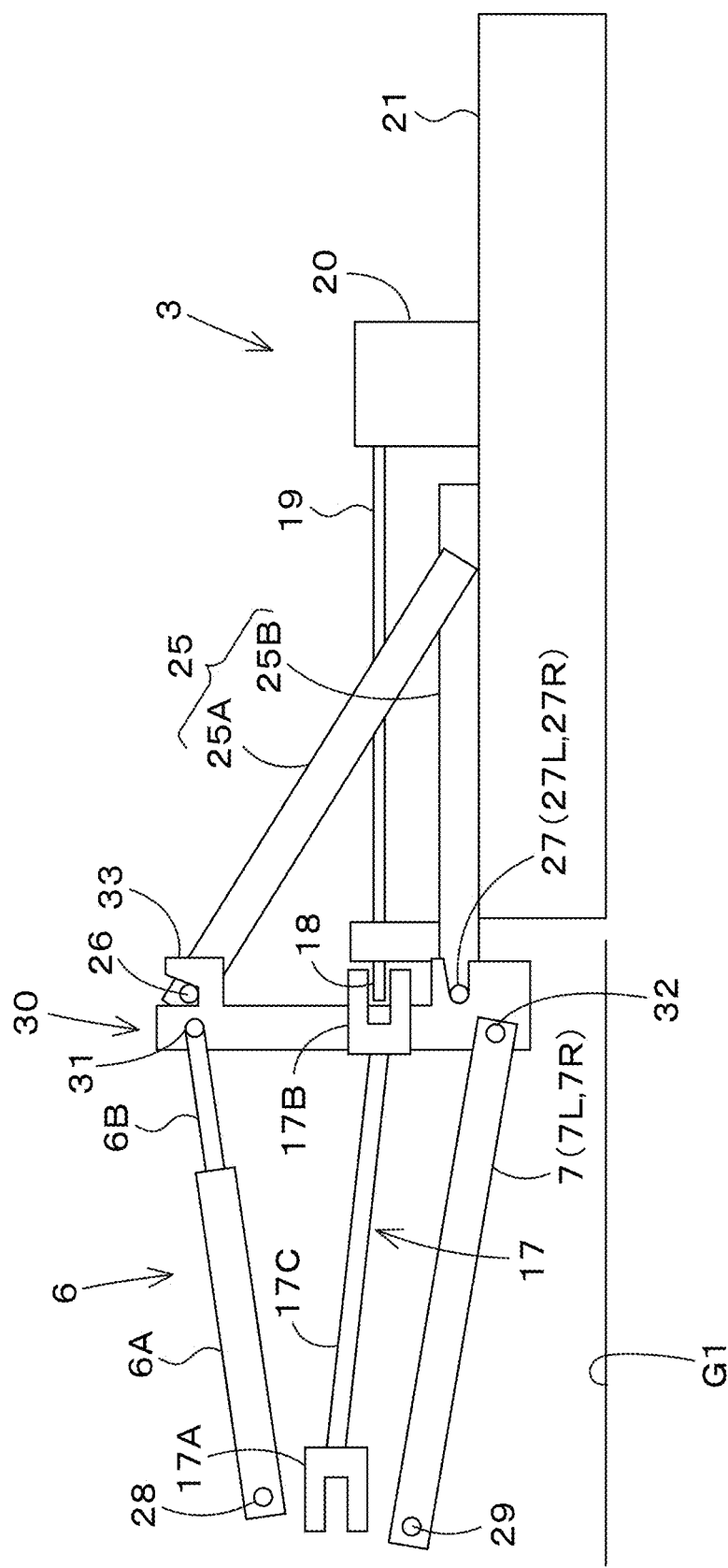
FIG. 8 is a side view illustrating a state where a direct-mounting working machine takes a working machine.

Then, as shown in FIG. 8, when the working machine 3 touches the ground plane G1 and takes the working posture, the position of the engagement member 38 coincides with the lock portion 41c, and the support member 46 moves upward by the force of the biasing spring 47, causing the third portion 38c to insert into the lock portion 41c (see FIG. 2 and FIG. 3). The expansion and retraction of the top linkage 6 is locked when the third portion 38c fits into the lock portion 41c.

In this manner, the direct-mounted working machine 3 is coupled to the tractor 2 in the first coupling configuration by the working machine coupler device 1.

Figure 9:
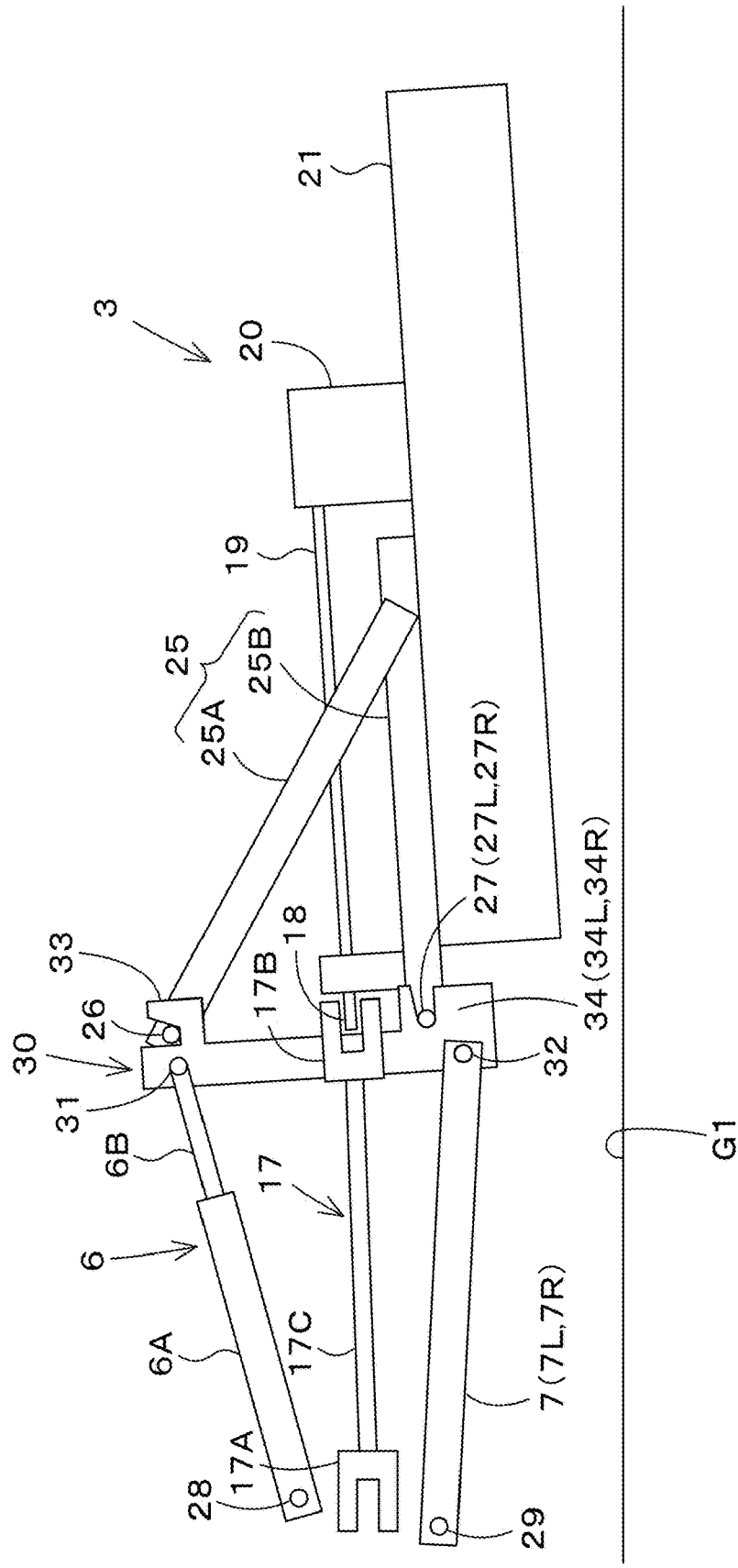
FIG. 9 is a side view illustrating a state where a direct-mounting working machine is lifted.

When turning or moving to a neighboring or remote location, the working machine 3 can be lifted by the hydraulic system 12 and the three-point linkage mechanism 5, and the like, as shown in FIG. 9.

As mentioned above, when the working machine 3 takes the working posture from the front lifted state, the engagement member 38 relatively moves in the engagement groove 41 to allow the top linkage 6 to shorten. That is, the engagement member 38 allows shortening of the top linkage 6 when the engagement member 38 relatively moves in the engagement groove 41 as the working machine 3 lowers to take the working posture from the front lifted position.

In detaching the working machine 3, the restriction by the locking mechanism that restricts the first lower coupler portion 27 from being detached from the second lower connecting section 34 is released, and the switching mechanism 39 is placed at the first position P1. The release of the locking mechanism can be operated by the operator seat 11 side by, for example, lifting the detachable frame 30.

To bring the switching mechanism 39 to the first position P1, the three-point linkage mechanism 5 is moved up and down. That is, when a load is applied to the top linkage 6, the third portion 38c does not come out of the lock portion 41c, so the three-point linkage mechanism 5 is raised and lowered, and when the load on the top linkage 6 becomes zero, the lock on the top linkage 6 is released and the third portion 38c can be removed from the lock portion 41c. When the third portion 38c is removed from the lock portion 41c, the top linkage 6 is free to expand and contract.

In this state, the working machine 3 can be detached from the detachable frame 30 by moving the tractor 2 forward or by moving the tractor 2 forward while gradually lowering after raising the three-point linkage mechanism 5.

Next, referring to FIG. 10 to FIG. 13, the coupling configuration (second coupling configuration) to couple the towing working machine 3 (working machine 3 operated in a floating state) to the tractor 2 will be described below.

Figure 10:
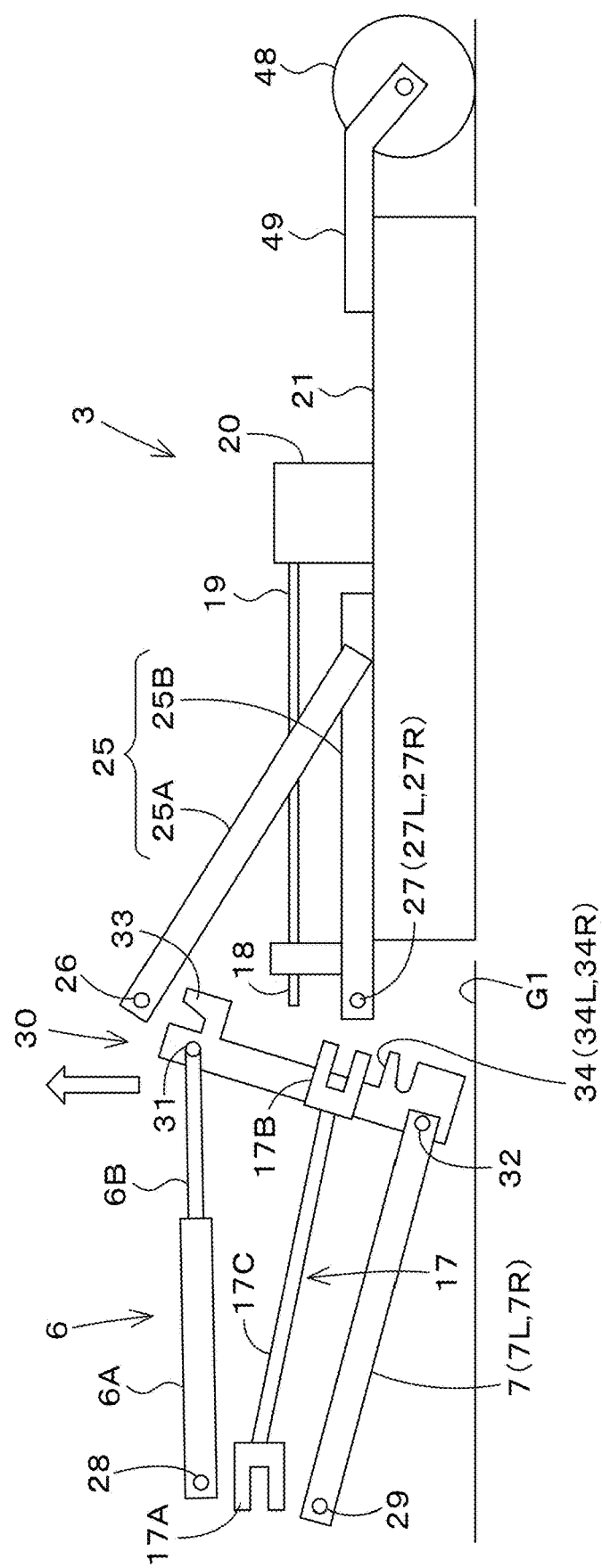
FIG. 10 is a side view illustrating a state before coupling of a towing working machine.

As shown in FIG. 10, the towing working machine 3 includes a grounding wheel (gauge wheel) 48 at the rear portion. The grounding wheel 48 is attached to the cover case 21 by a bracket member 49. When this towing working machine 3 is connected, the working machine 3 is also placed on the ground plane G1 in the working posture, which is the working posture.

In the case of coupling the towing type working machine 3, the working machine 3 is lifted up and the PIC shaft 16 is automatically connected to the second universal coupler portion 17B as well as the first lower coupler portion 27 to the second lower coupler portion 34 until the PIC shaft 16 is automatically connected to the second universal coupler portion 17B, in the same manner as in the case of coupling the direct-mounted working machine 3 described above.

Figure 11:
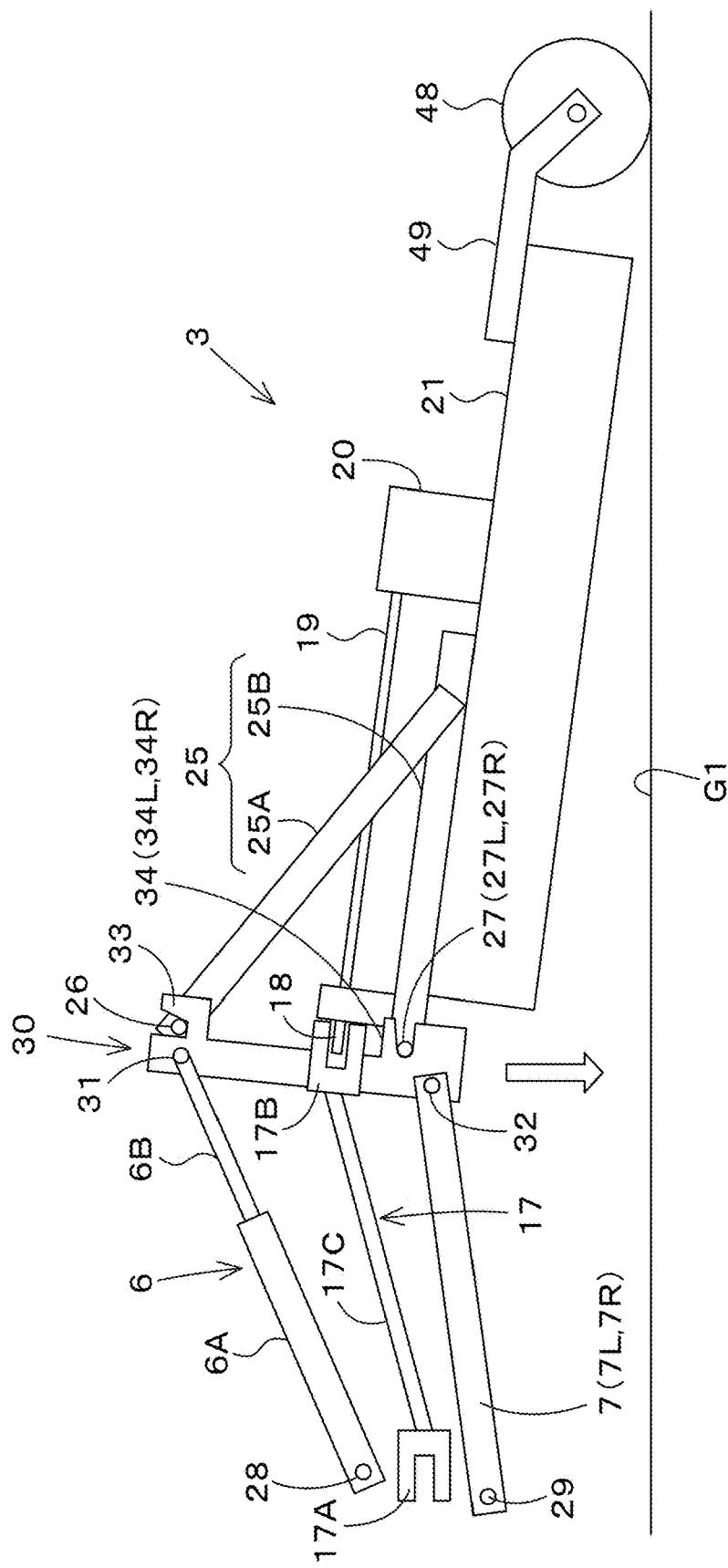
FIG. 11 is a side view illustrating a state where a towing working machine is coupled to a detachable frame.

That is, with the movable member 44 at the first position P1, and with the top linkage 6 extended and the detachable frame 30 tilted backward, as shown in FIG. 10, the tractor 2 is moved backward to position the second upper coupler portion 33 below the first upper coupler portion 26. Then, from this state, the lower linkage 7 is pivoted upward to raise the detachable frame 30, and the second upper coupler portion 33 is engaged with the first upper coupler portion 26. Then, when the detachable frame 30 is raised further, the working machine 3 is lifted and the front portion of the working machine 3 moves upward, as shown in FIG. 11. As the front portion of the working machine 3 moves upward, the working machine 3 pivots around the first upper coupler portion 26 in a direction approaching close to the detachable frame 30 so that the first lower coupler portion 27 engages with the second lower coupler portion 34 and the PIC shaft 16 is automatically coupled to the second universal coupler portion 17B. This causes the working machine 3 to be automatically coupled to the tractor 2.

Next, in this second coupling configuration, the movable member 44 is placed at the second position P2. That is, the movable member 44 is placed at a position where the second portion 38b can be inserted into the engagement groove 41. However, in the state shown in FIG. 11, the first portion 38a is inserted into the first groove 41a and the upper surface 38e of the second portion 38b is in contact with the lower surface of the plate member 37 (see FIG. 4). In other words, the engagement member 38 does not move when the movable member 44 is placed at the third position P3. Thus, when the movable member 44 is positioned at the second position P2, the movable member 44 moves upward relative to the support member 46 and the engagement member 38, and the support member 46 is detached from the upper portion 44b of the movable member 44.

Figure 12:
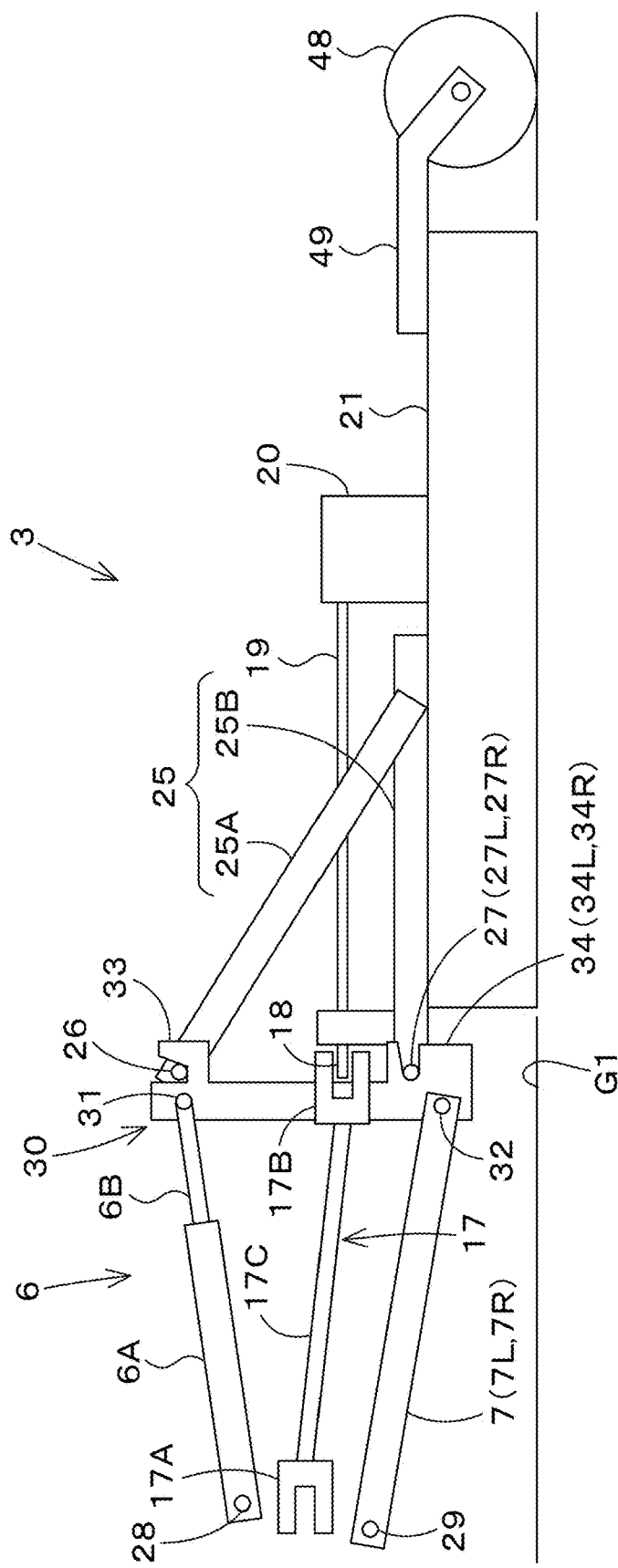
FIG. 12 is a side view illustrating a state where a towing working machine takes a working posture.

Next, from the forward inclining state in which the front portion of the working machine 3 is moved upward, as shown in FIG. 11, the lower linkage 7 is pivoted downward to lower the detachable frame 30. Then the front portion of the working machine 3 is lowered and the working posture of the working machine 3 is shown in FIG. 12. As the front portion of the working machine 3 lowers, the top linkage 6 shortens and the plate member 37 moves forward with respect to the engagement member 38. In other words, the engagement member 38 moves backward relative to the engagement groove 41. When the engagement member 38 moves to a position corresponding to the second groove 41b as the top linkage 6 shortens, the support member 40 and the engagement member 38 are raised by the force of the biasing spring 47, so that the second portion 38b fits into the second groove 41b and the upper surface 38d of the third portion 38c touches the lower surface of the plate member 37 (see FIG. 5).

In this manner, the towing working machine 3 is connected to the tractor 2 by the working machine coupler device 1.

In the coupling configuration of the towing working machine 3, when the working machine 3 takes the working posture shown in FIG. 12, the top linkage 6 is not locked to extend and retract, but the top linkage 6 is regulated to extend and retract within a range (a predetermined range) where the second portion 38b moves in the engagement groove 41 relative to the second range E2. In other words, the working machine 3 is in the floating state that follows the ground plane G1 in the second range E2, where the second portion 38b moves in the engagement groove 41 relative to the ground plane G1. In other words, the expansion and retraction of the top linkage 6 is regulated within a predetermined range where the second section 38b moves relative to the floating portion 41g (the second groove portion 41b and the lock portion 41c), which allows the working machine 3 to follow the ground plane G1. Thus, the engagement groove 41 includes the floating portion 41g that regulates the expansion and retraction of the top linkage 6 to a predetermined range (second range E2) when the working machine 3 takes the working posture, allowing the working machine 3 to follow the ground plane G1.

Figure 13:
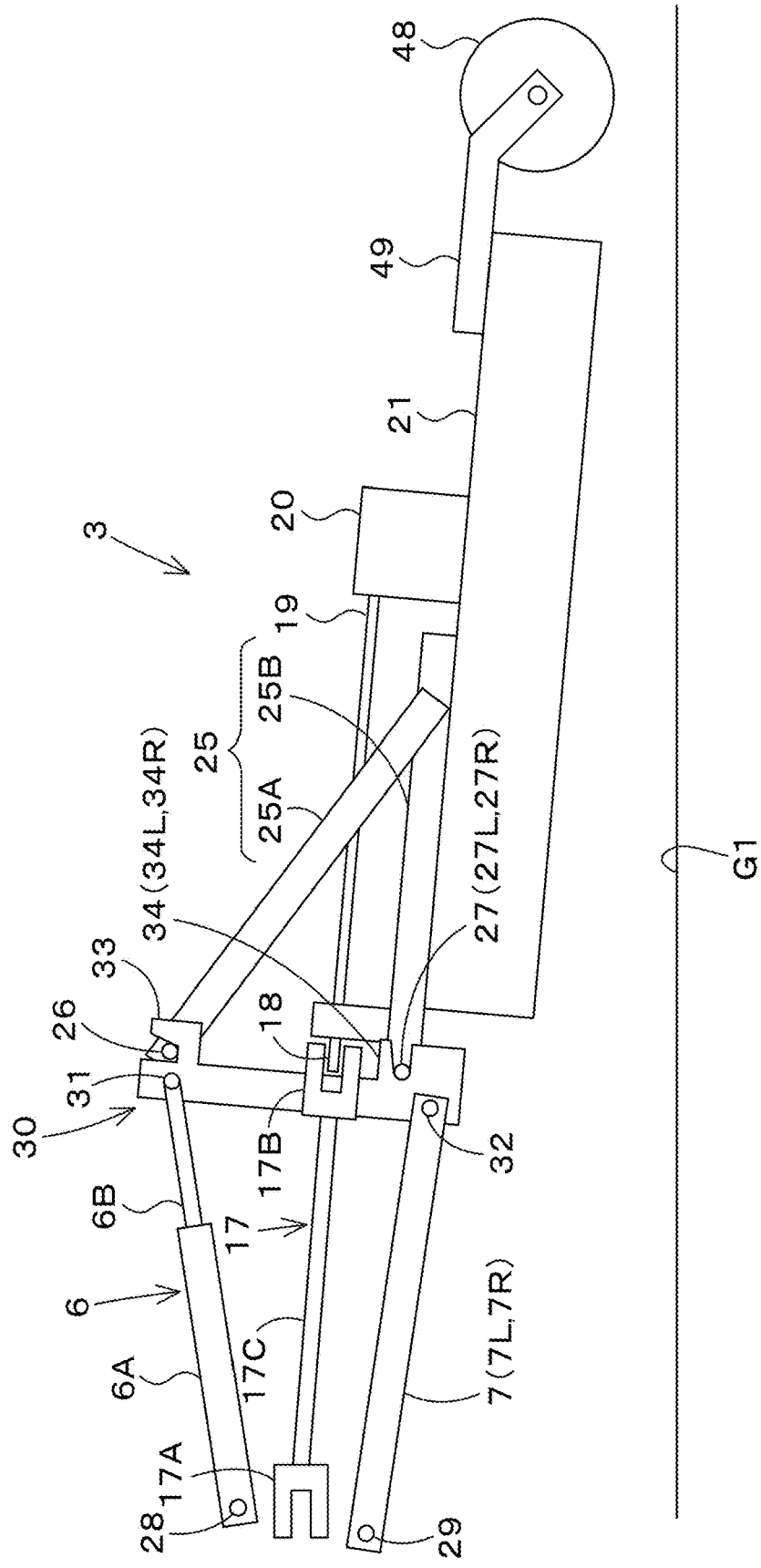
FIG. 13 is a side view illustrating a state where a towing working machine is lifted.

In this second coupling configuration of coupling the towing working machine 3, when the working machine 3 is turned or moved to a neighboring or remote location, the second portion 38b moves forward relative to the floating portion 41g when the working machine 3 is lifted by the hydraulic system 12, the three-point linkage mechanism 5, and the like. When the second portion 38b moves to the front end of the floating portion 41g and touches the second regulation portion 41e, the extension of the top linkage 6 is regulated. This allows the working machine 3 to be regulated to lower and lift the working machine 3, as shown in FIG. 13.

As described above, when the front portion of the working machine 3 is moved downward from the upwardly lifted position to the working posture, either the first coupling configuration or the second coupling configuration can be selected by the switching mechanism 39 by selecting the second position P2 or the third position P3.

In the second coupling configuration, in which the towing working machine 3 is connected to the traveling vehicle 2, the detachment of the working machine 3 is performed in much the same way as the direct-mounted working machine 3 described above.

As described in detail above, in the working machine coupler device 1 of the present preferred embodiment, when coupling the working machine 3 to the tractor 2, the second upper coupler portion 33 can be positioned below the first upper coupler portion 26 without putting the working machine 3 in a forward inclining posture by tilting the detachable frame 30 backward. This eliminates the need for a stand to hold the working machine 3 in a forward inclining position and allows the working machine 3 to be easily connected.

A single top linkage controller mechanism 36 can be used to connect both the direct-mounted working machine 3 and the towing working machine 3.

In addition, the working machine coupler device 1 of this preferred embodiment provides the following advantageous effects.

The working machine coupler device includes the top linkage 6 pivotally supported on a traveling vehicle 2 upward and downward, the top linkage 6 being configured to stretch and shorten, the lower linkage 7 pivotally supported on the traveling vehicle 2 upward and downward, the detachable frame 30 connecting the top linkage 6 and the lower linkage 7, the detachable frame 30 including the second upper coupler 3 to be coupled to a first upper coupler 26 provided to the working machine 3, and the second lower coupler 34 to be coupled to the first lower coupler 27 provided to the working machine 3, and the top linkage controller mechanism 36 to control stretching and shortening of the top linkage 6. The second upper coupler 33 of the detachable frame 30 inclining backward is coupled to the first upper coupler 26 when the lower linkage 7 is pivoted upward, and the first lower coupler 27 is configured to move toward and be coupled to the second lower coupler 34 when a front portion of the working machine 3 is moved upward, and the top linkage controller mechanism 36 is configured to regulate the stretching and shortening of the top linkage 6 to hold the detachable frame 30 inclining backward, and allows the top linkage 6 to be shortened until the working machine 3 takes the working posture after the lower linkage 7 is pivoted downward from a state where the front portion of the working machine 3 is lifted.

According to this configuration, the working machine 3 can be connected to the traveling vehicle 2 without having to tilt the working machine 3.

The top linkage controller mechanism 36 includes the engagement groove 41 and the engagement member 38 that engages with the engagement groove 41, the engagement groove 41 includes the first regulator portion 41d that holds the detachable frame 30 in a backwardly inclining state when the engagement member 38 contacts the engagement groove 41, and the engagement member 38 allows the top linkage 6 to be shortened by moving relative to the engagement groove 41 when the working machine 3 lowers from the front lifting position to the working posture.

According to this configuration, the top linkage controller mechanism 36 can be easily configured.

The engagement groove 41 includes the lock portion 41c that locks the expansion and retraction of the top linkage 6 by fitting the engagement member 38 when the working machine 3 takes the working posture.

According to this configuration, for example, a direct-mounted work machine 3 can be connected.

The engagement groove 41 includes the floating portion 41g that regulates the expansion and retraction of the top linkage 6 by fitting the engagement member 38 when the working machine 3 takes the working posture, within a range that allows the working machine 3 to follow the ground plane G1.

According to this configuration, for example, the working machine 3 operated in the floating state can be connected.

The floating portion 41g includes the second regulator portion 41e that regulates the extension of the top linkage 6 by retracting the engagement member 38 when the lower linkage 7 is pivoted upward to lift the working machine 3 from the working posture.

According to this configuration, the working machine 3 can be lifted when the working machine 3 operated in the floating state is coupled.

The top linkage controller mechanism 36 includes the switching mechanism 39 that allows selection of one of the first coupling configuration that locks the expansion and retraction of the top linkage 6 when the working machine 3 takes the working posture, and the second coupling configuration that regulates the expansion and retraction of the top linkage 6 to a predetermined range E2 and allows the working machine 3 to follow the ground plane G1 when the working machine 3 takes the working posture.

According to this configuration, it is convenient to select the coupling configuration of the working machine 3.

The top linkage controller mechanism 36 includes the engagement groove 41 and the engagement member 38 to be engaged with the engagement groove 41. The engagement groove 41 includes the first regulator 41d to hold the detachable frame 30 inclining backward with the engagement member 38 contacting to the first regulator 41d, the lock portion to be engaged with the engaged member 38 to lock stretch of the top linkage 6 when the working machine 3 takes the working posture in the first coupling configuration, the floating portion 41g to be engaged with the engagement member 38 to regulate stretch of the top linkage 6 within a range allowing the working machine 3 to follow a ground surface when the working machine 3 takes the working posture in the second coupling configuration, the engagement member 38 moves relatively to the engagement groove 41 while the working machine 3 gradually takes the working posture from a posture where the front portion of the working machine 3 is lifted and allows the top linkage 6 to be shortened, and the floating portion 41g includes the second regulator 41e to contact to the engagement member 38 to regulate the stretch of the top linkage 6 when the lower linkage 7 is moved upward to lift the working machine 3 from the working posture.

According to this configuration, the top linkage controller mechanism 36, which can be switched between the first and second coupling configurations, can be easily configured.

A working machine coupling method, which couples the working machine 3 to the traveling vehicle 2 with the working machine coupler device 1 including the top linkage 6 pivotally supported on the traveling vehicle 2 upward and downward, the top linkage 6 being configured to stretch and shorten, the lower linkage 7 pivotally supported on the traveling vehicle 2 upward and downward, and the detachable frame 30 connecting the top linkage 6 and the lower linkage 7, the detachable frame 30 including the second upper coupler 33 to be coupled to the first upper coupler 26 provided to the working machine 3, and the second lower coupler 34 to be coupled to the first lower coupler 27 provided to the working machine 3, includes stretching the top linkage 6 to incline the detachable frame 30 backward, moving the lower linkage 7 upward with respect to the working machine 3 to engage the second upper coupler 33 with the first upper coupler 26 in a state where the detachable frame 30 inclines backward, moving the lower linkage 7 upward to lift a front portion of the working machine 3 after engaging the second upper coupler 33 with the first upper coupler 26 to engage the second lower coupler 34 with the first lower coupler 27, and moving the lower linkage 7 downward until the working machine 3 takes the working posture from a state where the front portion of the working machine 3 is lifted.

According to this configuration, the working machine 3 can be connected to the traveling vehicle 2 without having to tilt the working machine 3.

In addition, when the working machine 3 takes the working posture, the expansion and retraction of the top linkage 6 is locked.

According to this configuration, for example, the direct-mounted working machine 3 can be connected to the traveling vehicle 2.

When the working machine 3 takes the working posture, the top linkage 6 extends and retracts within a range that allows the working machine 3 to follow the ground plane G1.

According to this configuration, for example, it is possible to articulate the working machine 3 operated in the floating state.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine coupler device comprising:
a top linkage pivotally supported on a traveling vehicle upward and downward, the top linkage being configured to stretch and shorten;
a lower linkage pivotally supported on the traveling vehicle upward and downward;
a detachable frame connecting the top linkage and the lower linkage, the detachable frame including:
a second upper coupler to be coupled to a first upper coupler provided to a working machine; and
a second lower coupler to be coupled to a first lower coupler provided to the working machine; and
a top linkage controller to control stretching and shortening of the top linkage; wherein
the second upper coupler of the detachable frame inclining backward is coupled to the first upper coupler when the lower linkage is pivoted upward, and the first lower coupler is configured to move toward and be coupled to the second lower coupler when a front portion of the working machine is moved upward;
the top linkage controller is configured to regulate the stretching and shortening of the top linkage to hold the detachable frame inclining backward, and to allow the top linkage to be shortened until the working machine takes a working posture after the lower linkage is pivoted downward from a state where the front portion of the working machine is lifted;
the top linkage controller includes an engagement groove and an engagement body to be engaged with the engagement groove; and
the engagement groove includes a lock portion to be engaged with the engagement body to lock the stretching and shortening of the top linkage when the working machine takes the working posture.

2. The working machine coupler device according to claim 1, wherein
the engagement groove includes:
a first regulator to hold the detachable frame inclining backward with the engagement body contacting the first regulator; and
the engagement body moves relatively to the engagement groove and allows the top linkage to be shortened while the working machine gradually takes the working posture from a posture where the front portion of the working machine is lifted.

3. A working machine coupler device comprising:
a top linkage pivotally supported on a traveling vehicle upward and downward, the top linkage being configured to stretch and shorten;
a lower linkage pivotally supported on the traveling vehicle upward and downward;
a detachable frame connecting the top linkage and the lower linkage, the detachable frame including:
a second upper coupler to be coupled to a first upper coupler provided to a working machine; and
a second lower coupler to be coupled to a first lower coupler provided to the working machine; and
a top linkage controller to control stretching and shortening of the top linkage; wherein
the second upper coupler of the detachable frame inclining backward is coupled to the first upper coupler when the lower linkage is pivoted upward, and the first lower coupler is configured to move toward and be coupled to the second lower coupler when a front portion of the working machine is moved upward;
the top linkage controller is configured to regulate the stretching and shortening of the top linkage to hold the detachable frame inclining backward, and to allow the top linkage to be shortened until the working machine takes a working posture after the lower linkage is pivoted downward from a state where the front portion of the working machine is lifted;
the top linkage controller includes an engagement groove and an engagement body to be engaged with the engagement groove; and
the engagement groove includes a floating portion to be engaged with the engagement body to regulate the stretching and shortening of the top linkage within a range allowing the working machine to follow a ground surface when the working machine takes the working posture.

4. The working machine coupler device according to claim 3, wherein the floating portion includes a second regulator to contact the engagement body to regulate the stretching of the top linkage when the lower linkage is pivoted upward to lift the working machine from the working posture.

5. The working machine coupler device according to claim 4, wherein
the top linkage controller includes a switch to selectively take either a first coupling configuration or a second coupling configuration;
the engagement groove includes:
a first regulator to hold the detachable frame inclining backward with the engagement body contacting the first regulator;
a lock portion to be engaged with the engagement body to lock the stretching and shortening of the top linkage when the working machine takes the working posture in the first coupling configuration;
the floating portion to be engaged with the engagement body to regulate the stretching and shortening of the top linkage within the range allowing the working machine to follow the ground surface when the working machine takes the working posture in the second coupling configuration; and
the engagement body moves relatively to the engagement groove and allows the top linkage to be shortened while the working machine gradually takes the working posture from a posture where the front portion of the working machine is lifted.

6. A working machine coupling method, which couples a working machine to a traveling vehicle with a working machine coupler device including a top linkage pivotally supported on a traveling vehicle upward and downward, the top linkage being configured to stretch and shorten, a lower linkage pivotally supported on the traveling vehicle upward and downward, a detachable frame connecting the top linkage and the lower linkage, the detachable frame including: a second upper coupler to be coupled to a first upper coupler provided to a working machine, and a second lower coupler to be coupled to a first lower coupler provided to the working machine, and a top linkage controller to control stretching and shortening of the top linkage, the top linkage controller including an engagement groove and an engagement body to be engaged with the engagement groove, the engagement groove including a lock portion to be engaged with the engagement body to lock the stretching and shortening of the top linkage when the working machine takes a working posture, the method comprising:

stretching the top linkage to incline the detachable frame backward;

pivoting the lower linkage upward with respect to the working machine to engage the second upper coupler with the first upper coupler in a state where the detachable frame inclines backward;

pivoting the lower linkage upward to lift a front portion of the working machine after engaging the second upper coupler with the first upper coupler to engage the second lower coupler with the first lower coupler; and pivoting the lower linkage downward until the working machine takes the working posture from a state where the front portion of the working machine is lifted.

7. The working machine coupling method according to claim 6, further comprising locking the stretching and shortening of the top linkage with the lock portion when the working machine takes the working posture.

8. The working machine coupling method according to claim 6, further comprising regulating the stretching and shortening of the top linkage within a range allowing the working machine to follow a ground surface when the working machine takes the working posture.

* * * * *